Feb. 1, 1966 K. R. McKEE 3,233,050

CROSS BAR SWITCH WITH ACTUATING PIN STRUCTURE

Filed July 5, 1961 7 Sheets-Sheet 1

INVENTOR:
Kenneth R. McKee

By Smyth, Roston & Pavitt
Attorneys

Feb. 1, 1966 K. R. McKEE 3,233,050

CROSS BAR SWITCH WITH ACTUATING PIN STRUCTURE

Filed July 5, 1961 7 Sheets-Sheet 2

INVENTOR:
Kenneth R. McKee

By Smyth, Roston & Pavitt
Attorneys

INVENTOR:
Kenneth R. McKee
By Smyth, Roston & Pavitt
Attorneys

CROSS BAR SWITCH WITH ACTUATING PIN STRUCTURE

Filed July 5, 1961 7 Sheets-Sheet 4

INVENTOR:
Kenneth R. McKee
By Smyth, Roston & Pavitt
Attorneys

Feb. 1, 1966 K. R. McKEE 3,233,050

CROSS BAR SWITCH WITH ACTUATING PIN STRUCTURE

Filed July 5, 1961 7 Sheets-Sheet 5

INVENTOR:
Kenneth R. McKee
By Smyth, Roston & Pavitt
Attorneys

Feb. 1, 1966 K. R. McKEE 3,233,050

CROSS BAR SWITCH WITH ACTUATING PIN STRUCTURE

Filed July 5, 1961 7 Sheets-Sheet 6

INVENTOR:
Kenneth R. McKee

By Smyth, Roston & Pavitt
Attorneys

INVENTOR:
Kenneth R. McKee

By Smyth, Roston & Pavitt
Attorneys

United States Patent Office 3,233,050
Patented Feb. 1, 1966

3,233,050
CROSS BAR SWITCH WITH ACTUATING PIN STRUCTURE

Kenneth R. McKee, Van Nuys, Calif., assignor, by mesne assignments, to McKee Automation Corporation, North Hollywood, Calif., a corporation of California Filed July 5, 1961, Ser. No. 121,959
15 Claims. (Cl. 200—16)

A matrix-type selector switch in accordance with the invention described below can be programmed internally or externally to select, and to establish or disestablish, a circuit between one line, or one group of lines, and one of four other lines or groups of lines, at each crosspoint of the matrix. Through use of a unique cross-action contact arrangement in conjunction with stationary contact rods mounted on a removable connector unit, the functional capabilities of this selector switch far exceed those of any selector switch known to the prior art.

A typical switch in accordance with this invention can select any one of four single line or multi-line circuits at each crosspoint of its matrix and connect or disconnect this circuit with respect to a fifth, or common, circuit. For example, a switch having a matrix of ten parallel bars crossing ten other parallel bars has one hundred crosspoints, each formed of a bar and a crossing bar. Each of the matrix bars is mounted for bidirectional displacement from a normal position along a line colinear with its longitudinal axis. Thus, the two bars of each crosspoint can be displaced selectively and at the same time in any one of four combinations of directions from their respective normal positions. Accordingly, this embodiment of the switch will be capable of selecting any one of four hundred circuits, and establishing or disestablishing a connection between the selected circuit and a common circuit.

A unique contact structure makes it possible to displace the two bars forming each crosspoint simultaneously and still obtain quick contact closure and separation in addition to a moderate wiping stroke. Moreover, simultaneous displacement of a pair of crossbars makes it possible to complete a switching action in a time period shorter by milliseconds than the time required for a conventional sequential-displacement crossbar switch to complete an equivalent switching action. The unique contact structure also makes it possible to provide the wide intercontact gaps required for high-voltage insulation leakage tests.

This novel selector switch also includes a removable switch connector unit having a plurality of contact rods which constitute one contact member in each of the switching elements of this switch. The phrase, "switching element" as used here and below should be understood to mean a contact rod in cooperative relation with a resilient contact arm. Thus, one of the two contacts in each of the switching elements at each crosspoint of the matrix is a contact rod of the removable connector unit. This feature virtually eliminates the necessity of internal switch wiring for all applications envisioned for this switch, and makes it possible to achieve internal programming of switching action either through the use of an insertable punched card or extensible contact rods.

By slightly modifying the switching elements, this selector switch can open, for example, any one of four normally-closed switching elements at a selected crosspoint of the matrix. Hence, if the switch has one hundred crosspoints, four hundred switching elements may be normally closed, but selective displacement of the two bars comprising any one of the one hundred crosspoints will open a selected one of the closed elements. This capability is especially valuable in the performance of insulation leakage tests at high voltage.

In a further modification of this selector switch, the switching elements of the matrix are designed to enable two connector units to be coupled to opposite sides of the same matrix. With this arrangement, it is possible to close or open any one of four circuits between coaxially-aligned contact rods at each crosspoint.

Conversely, a multiplicity of congruent matrixes may be arranged side by side so that corresponding crosspoints of each are in collinear relation, and a single connector unit may be provided having contact rods which extend through each matrix. A selector switch in accordance with this arrangement, makes it possible to program the matrixes for selecting simultaneously a number of contact pins of the connector unit equal to the number of matrixes.

In general, the many functional advantages of a selector switch in accordance with this invention are derived from the use of an ingenious matrix-contact arm assembly in conjunction with a switch connector unit having contact rods which extend into the assembly. The contact rods serve as external line connectors and as stationary contacts for the switching eelments associated with each crosspoint. The contact arms constitute the movable contact for each switching element.

The matrix is formed from first and second sets of spaced-apart, parallel bars. The bars of the first set lie in a first common plane, and bars of the second set lie in a second common plane parallel to and beside the first plane. The bars of the first set are in perpendicular relation to the bars of the second set, so that crosspoints will be formed at each crossing of a bar of one set with a bar of the other. Each bar of the matrix is mounted for longitudinal and bidirectional displacement from a normal position. Four contact arms made of elongated, resilient, highly-conductive material are coupled to a bar of each crosspoint so that two contact arms will extend from one side of the bar in crossing relation with respect to the other bar of the crosspoint, and the other two contact arms will have a similar orientation on the other side of the bar. Two actuator pins are mounted on the other bar adjacent to the two crossings of the contact arms, so that displacement of the latter bar will cause one of the actuator pins to move into deflecting position with respect to its adjacent contact arms. Movement of the actuator pins alone, however, will be insufficient to deflect the contact arms far enough to operate a switching element; the bar on which the contact arms are mounted also must be displaced in order to deflect one of the arms far enough to operate the switching element to which it belongs.

The ingenious structure of the matrix-contact arm assembly makes it possible to provide wide spacing between the contact surfaces of the contact arms and the bars of the matrix. As a result, the contact rod-connector unit may be removed and replaced in its position on the matrix with little likelihood of deformation or other damage to the contact arms or contact rods. A further advantage is the fact that several contact rod-connector units can be used and interchangeably connected rapidly and easily to the same matrix. In doing this, a number of single or multiple circuits, equal to four times the number of crosspoints in the matrix, may be connected or disconnected at the same time from the selector switch. Moreover, this connection or disconnection does not require the use of large pushing or pulling forces to overcome frictional engagement between connector pins and their respective receptacles, as would be the case if a connector unit of conventional design were to be used. This, then, is another important feature, one which makes it possible to achieve almost friction-free installation and removal from the switch of a single connector having an indefinitely large number of lines and contact rods. It is this feature which enables users of this novel selector switch to set up and conduct tests involving large numbers of conductors with a rapidity and flexibility of programming unknown to the prior art.

The term "crossbar" has been used extensively to designate selector switches of the matrix type. A conventional crossbar switch, for example, may be comprised of spaced-apart horizontal bars and spaced-apart vertical bars disposed so that the horizontal and vertical bars are in crossing relation. In this manner, a matrix of crosspoints is formed. Each crosspoint is made up of a single horizontal and a single vertical bar. Each horizontal and vertical bar is mounted for displacement from a normal position along its longitudinal axis, and one or more electrical contacts may be affixed to each bar comprising a crosspoint. The switching elements at each crosspoint may be arranged to be normally closed or normally open when the bars are in their normal position, and to be in their opposite state when both bars of the crosspoints are in their displaced position.

In conventional crossbar switches, the design of the switching element at each crosspoint requires sequential displacement of the bars of the crosspoint in order to achieve effective switching action. In addition, only a single switching element can be provided at each crosspoint, and the dimensions of the gap between contact surfaces of each switching element must necessarily be kept small in order to achieve switching times short enough for many important applications.

The principal mode of operation of the conventional crossbar switch is analogous to the switching action of an ordinary rotary switch, but the latter is subject to many disadvantages which are not present in the former. For example, the time required to select and switch any switching element of the crossbar switch may be made constant, while the times required for selection and switching in an equivalent rotary switch are variable. Unlike a rotary switch, a crossbar switch may operate a selected circuit directly, without being subject to the disadvantage of momentarily operating one or more intermediate switching elements, as must be done in the case of the rotary switch when its common contact is rotated to a remote contact position.

More generally, a crossbar switch is the operational equivalent of a large network of switching relays. Here again, the crossbar switch is superior. For example, less power is required because the crossbar switch requires only that two bidirectional coils be energized in order to effect switching action at any one of the crosspoints of a matrix. In contrast, a relay network may require energization of a large number of relay coils to effect many equivalent switching actions. In addition, the crossbar switch requires less space, and eliminates the expensive and time consuming buss-bar wiring techniques normally required for operation of relay networks at low voltage and current levels.

Although the advent of the conventional crossbar switch eliminated many disadvantages which arose from the pre-existing necessity of using either a rotary switch or a relay network, it is itself subject to many limitations. Among these is the requirement of sequential displacement of the crossbars at the selected crosspoint in order to achieve reliable and serviceable switching action at reasonable cost. This requirement, of course, imposes severe limitations on the spacing of the contacts of switching elements, and the time required to effect switching action. In addition, the presence of only one switching element per crosspoint limits the switching capacity of a crossbar matrix. It is the limitation in gap size, and the resulting likelihood of arcing at the required high voltage, that makes conventional crossbar switches unsuitable for use in the performance of insulation leakage tests. A further disadvantage of conventional crossbar switches has been the comparative unreliability of switching elements. This has been caused in part by the ease with which the contacts of switching elements may become misaligned.

A matrix-type selector switch in accordance with this invention may embody all of the advantages of conventional crossbar switches while eliminating virtually all of their disadvantages. For example, a unique contact design makes it possible to mount four sets of switching elements at each crosspoint of a matrix. This means that bidirectional, longitudinal displacement of the bars of each crosspoint makes it possible to connect one of four output circuits to an input circuit, or vice versa. Other advantages attributable to the uniquely designed contact structure of the switching elements are an increased gap width without undue lengthening of the time required to effect switching action, and enhancement of reliability on account of elimination of the requirement for precise mechanical alignment of contact surfaces. The power required for a switching action also is minimized on account of the use of elongated resilient contact arms. And the bars of any crosspoint may be actuated simultaneously in order to minimize the time required for a switching action.

Other features and advantages of a matrix-type selector switch in accordance with this invention are attributable principally to an ingenious connector unit comprising extended contact rods. Each contact rod constitutes a stationary contact for each switching element. Thus, internal switch wiring becomes unnecessary. Once the contact rod-connector unit is installed on the matrix, the switch is internally wired and ready for use. Because the connector unit is an integral part of the selector switch, minimal force is required to install or remove this unit.

In effect, the matrix scans the contact rods directly. Inasmuch as the contact rods are, in fact, the connector pins which connect the electrical circuits to the selector switch, the necessity for multiple input connectors on the matrix frame and a large number of conductors or busses to the individual switching elements is wholly eliminated. A further advantage derived mainly from use of this ingenious connector unit, is the capability of internal programming through the use of punched cards or extension pins in a manner explained in further detail below. It should be noticed, of course, that the aforementioned features and advantages of the selector switch of this invention make it possible to improve maintainability, and to reduce markedly the space required in comparison to that occupied by a conventional crossbar switch having an equal switching capacity.

The foregoing paragraphs are intended to summarize and explain the significance of this invention in relation to the problems which it resolves, and should not be construed to narrow the scope of protection delineated by the claims. For a more complete understanding of the structure, operation, and novel features of typical embodiments, consider the following description with reference to the drawings, wherein:

For simplicity, the same elements will be designated with the same reference numerals in all the various figures of the drawings.

Figures 1, 2:
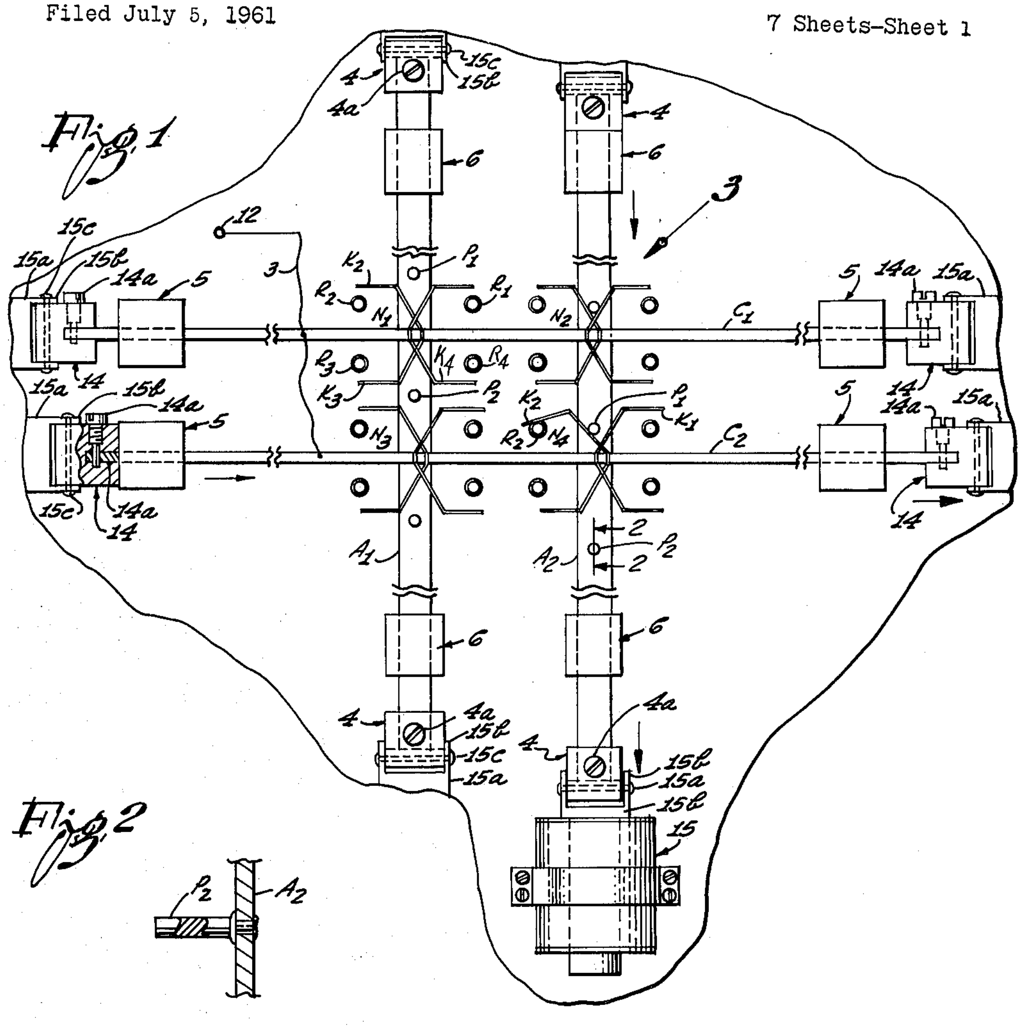
FIGURE 1 represents a plan view of a typical four bar, matrix-type selector switch in accordance with this invention having normally-open switching elements.
FIGURE 2 is a view through a typical actuator pin along the plane 2—2 of FIGURE 1.
Figure 3:
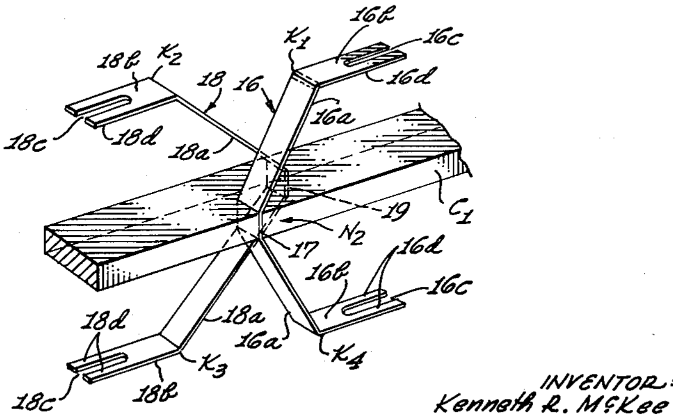
FIGURE 3 is an enlarged view of the contact arms of the crosspoint designated by the arrow 3 of FIGURE 1.

As represented in FIGURES 1–3, inclusive, and 5, respectively, a matrix-type selector switch in accordance with this invention may be comprised of a matrix made up of two actuator bars A1 and A2 and two carrier bars C1 and C2 arranged to form crosspoints N1, N2, N3, and N4; four stationary contact rods R1, R2, R3, and R4 for each of the crosspoints N1, N2, . . . N4; resilient contact arms K1, K2, K3, and K4 secured to the carrier bars C1 and C2 at each crosspoint N1, N2,, . . . N4 in cooperative relation to the contact rods R1, R2, R3, and R4; actuator pins P1 and P2 secured to the actuator bars A1 and A2, and in cooperative relation with the contact arms K1, K2, K3, and K4; and solenoids 15 coupled to the extremities of carrier bars C1 and C2, and actuator bars A1 and A2 for displacing these bars selectively and bidirectionally from their respective normal, or "resting" positions.

The carrier bars C1 and C2 are disposed in mutually spaced-apart and parallel relation, and the actuator bars A1 and A2 likewise are in mutually spaced-apart and parallel relation. The carrier bars C1 and C2 are perpendicular to the actuator bars A1 and A2. This arrangement constitutes a matrix having four crosspoints N1, N2, N3, and N4. It should be understood, of course, that the matrix may have any number of actuator bars A1, . . . A*n*, and any number of carrier bars C1, . . . C*n*, where N represents an integer, and that A*n* does not have to be equal to C*n*. Furthermore, the number of crosspoints N*n* of any matrix usually will be equal to the product of A*n* and C*n*. For example, a given matrix may have A*n*=8 actuator bars, and C*n*=11 carrier bars. If each of the A*n* bars crosses each of the C*n* bars, N*n*=A*n*.C*n*, and this matrix will have 88 crosspoints.

Figure 9:
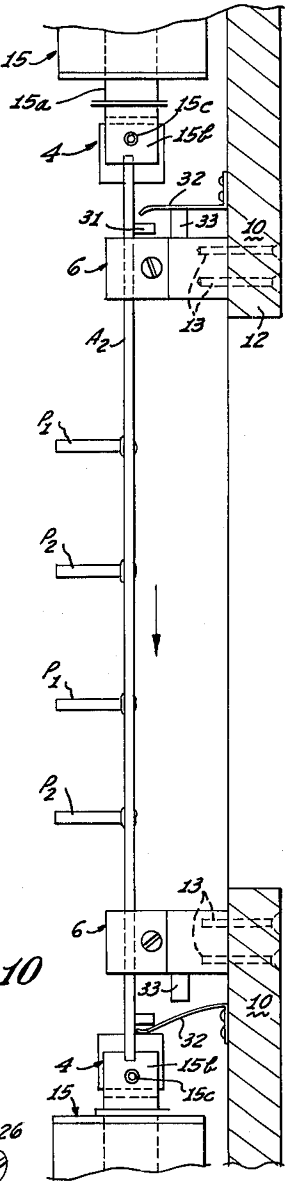
FIGURE 9 is a side view of the actuator bar A2, and represents the essential elements of a typical mounting structure for the bars of the matrix.

The carrier bars C1 and C2, made of a highly conductive corrosion-resistant material, are supported slidably adjacent to their respective extremities on bearing blocks 5 secured fixedly in position on opposite side members 11 (FIGURES 7 and 10) of a rectangular frame 10 (FIGURE 9). As a result, the carrier bars C1 and C2 may be moved bidirectionally along their longitudinal axes.

The actuator bars A1 and A2 likewise are mounted for bidirectional movement along their respective longitudinal axes in bearing blocks 6 secured, in turn, to opposite side members 12 of the rectangular frame 10.

Four resilient contact arms K1, K2, K3, and K4, made of electrically-conductive material, are secured to the carrier arms C1 and C2 at each of the four crosspoints N1, N2, N3, and N4. The contact arms K1 and K2 are secured in spaced-apart and crossing relation above one of the actuator bars A1 or A2. Likewise, K3 and K4 also are secured in spaced-apart and crossing relation above one of the actuator bars A1 or A2. An actuator pin P1, having one end secured to an actuator bar, A1 or A2, extends vertically in adjacent and spaced-apart relation to the crossing of contact arms K1 and K2. Likewise, an actuator pin P2 is disposed on an actuator bar in similar relation to the crossing of contact arms K3 and K4.

Four contact rods R1, R2, R3, and R4 are disposed at each of the crosspoints N1, N2, N3, and N4. The rods R1, . . . R4 are in perpendicular relation to the diagonals through each of the crosspoints and N1, . . . N4, and in normally spaced-apart relation with respect to the contact arms K1, K2, K3, and K4. Any one of the contact rods R1, R2, R3, or R4 and its associated contact arms K1, K2, K3, or K4 constitutes a switching element. Hence, four switching elements K1–R1, K2–R2, K3–R3, and K4–R4 are present at each of the crosspoints N1, N2, N3, and N4.

A solenoid 15 is coupled to each extremity of the carrier bars C1 and C2, and the actuator bars A1 and A2, for displacing each bar selectively from its normal position in either direction. The solenoids 15 have their plungers 15*a* secured to carrier bars C1 and C2 via coupling blocks 14, and to actuator bars A1 and A2 via coupling blocks 4. It should be understood, of course, that one of the solenoids 15 coupled to each bar may be eliminated if the other is of the push-pull type.

The solenoids 15 are programmed through the use of circuitry (not shown) which permits the displacement of only one of the actuator bars A1 or A2, and one of the carrier bars C1 or C2 at a time. The displacement of both bars is required to close one only of the four switching elements K1–R1, . . . K4–R4 at any given crosspoint. The particular switching element actuated in this manner will be determined by the direction in which the actuator and carrier bar of the crosspoint are shifted.

Inasmuch as the carrier and the actuator bar at each crosspoint can be shifted in either direction from its normal position, four combinations of displacements are possible. Hence, switching element K2–R2 at crosspoint N4 is shown in its closed position in FIGURE 1. To achieve this switching action, the lower solenoid 15 of actuator bar A2 has been energized to displace A2 in a downward direction, and the solenoid 15 coupled to the righthand extremity of carrier bar C2 has been energized to displace the latter toward the right. The downward displacement of A2 moved the actuator pin P1 into actuating relation with respect to the contact arms K1 and K2, and the displacement of the carrier bar C2 pulled contact arm K2 into deflecting relation against the actuator pin P1. Inasmuch as the displaced position of actuator pin P1 is close to the point where contact arm K2 is secured to C2, only a short displacement of the carrier bar C2 is required to effect rapid closing action of K2 across the wide gap of switching element K2–R2. Moreover, in closing K2 against R2, the former rubs against the latter in a short wiping stroke. This wiping action is the result of the further displacement of K2 by P1 after first contact occurs with R2, and is attributable principally to the counterclockwise bend in K2.

It should be understood, of course, that the wiping stroke is important in effecting a good, noise-free juncture between the contact surfaces of K2 and R2. The wiping stroke also helps keep these surfaces clean so that their rated resistance will be maintained.

In the aforedescribed manner, the displacement of actuator bar A2 in the downward direction in cooperation with the displacement of the carrier bar C2 toward the right results in the completion of an electrical circuit from terminal 12 via conductor 3, carrier bar C2, and contact arm K2 to another terminal (not shown) coupled to contact pin R2. The four switching elements K1–R1, . . . K4–R4 associated with crosspoint N1 may be closed selectively in like manner. For example, a downward displacement of actuator bar A1 and a leftward displacement of carrier bar C1 will close the switching element K1–R1, or a displacement of carrier bar C1 to the right will result in the closing of the switching element K2–R2. If the actuator bar A1 is displaced upwardly, leftward displacement of carrier bar C1 will close switching element K4–R4, or a displacement of C1 to the right will close K3–R3.

Although it is expected that a carrier bar C1 or C2 and an actuator bar A1 or A2 ordinarily will be displaced simultaneously, this is not essential for satisfactory operation of this selector switch. The switching action can be effected satisfactorily by a sequential displacement of the actuator and carrier bar, in either order, at the selected crosspoint.

As explained above, a matrix suitable for use with this switch may have any practicable number of carrier bars, and an equal or different number of actuator bars. The number of crosspoints formed usually will be equal to the product of the carrier bars and actuator bars, and the number of switching elements which can be accommodated will be four times as great.

Although the embodiments of the selector switch represented in the drawings have single-pole switching elements, it should be apparent that mulitple-pole switching elements may be used with only slight modification of the carrier bars, contact arms, and contact rods. For example, the width of a carrier bar could be increased sufficiently to accommodate a multiplicity of sets of contact arms, with corresponding sets at the various crosspoints being inter-coupled with a common conductor; the contact rods could be constructed of hollow, cylindrical material having internal dimensions large enough to accommodate separate conductors running to separate contact surfaces provided at intervals along the rod, and in cooperative relation with the multipole contact arms of a switching element; and the actuator pins could be lengthened as required in order to effect simultaneous deflection of all of the contact arms of one of the switching elements.

A typical actuator pin P2 is represented in FIGURE 2 as being comprised of a short length of cylindrical rod having one end of reduced diameter inserted through a hole in the actuator bar A2. The projecting end of pin P2 is then secured firmly to the bar. The pin P2 may be made of a nonconductive material, or if actuator bar A2 is itself made of nonconductive material, the pin P2 may be made of metal or any other conductive material.

Figure 4:
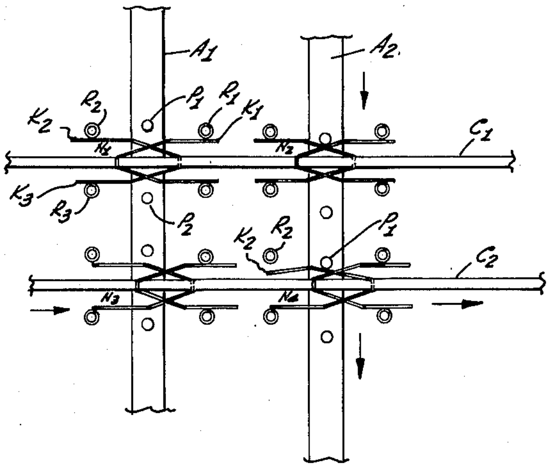
FIGURE 4 is a plan view of a selector switch in accordance with this invention having a four bar matrix and normally-closed switching elements.
Figure 5:
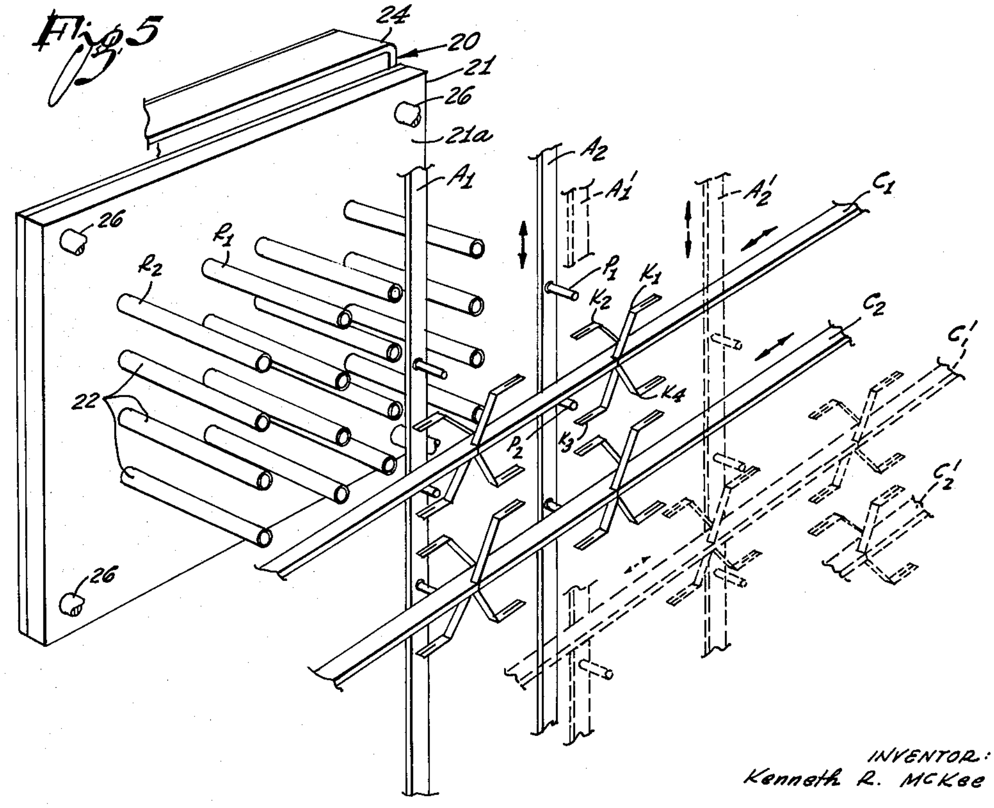
FIGURE 5 is an exploded view of a four bar, matrix-type selector switch in accordance with this invention showing the interrelationship of the connector unit, the actuator bars, the carrier bars, and further illustrating the use of a multiplicity of matrixes with a single connector unit.

The arrangement and structural features of the contact arms K1, K2, K3, and K4 at a typical crosspoint, in this instance N2 of FIGURE 1, are represented in FIGURE 3. The contact arms K1 and K4 are comprised of a single strip 16 of highly-conductive, resilient material secured, at its center in a transverse slot 17 provided in one edge of bar C1 a short distance from crosspoint N2. The extensions of strip 16 from slot 17 are bent toward crosspoint N2 to form diagonal segments 16*a*, and segments 16*b* parallel to bar C1. The contact arms K2 and K3 likewise are formed from a highly-conductive, resilient strip 18 secured in a transverse slot 19 provided in the opposite edge of bar C1 a short distance on the other side of crosspoint N2. In the case of strip 18, however, the segments 18*a* and 18*b* are the result of bending strip 18 in a direction opposite to the direction of the bends in strip 16. The parallel segments 16*b* and 18*b* of contact arms K1, K2, K3, and K4 are provided with bifurcations 16*c* and 18*c* to enhance and make virtually certain that a good electrical contact will exist whenever one of the contact arms is juxtaposed against one of the contact rods R1, R2, R3, or R4 (FIGURES 1, 4 or 5). The contact surfaces 16*d* and 18*d* may be gold plated to provide low electrical and high corrosion resistance. For the same reasons, the contact surfaces of contact rods R1, R2, R3, and R4 also may be gold plated.

The modified matrix-contact arm assembly of FIGURE 4 has four normally-closed switching elements K1–R1, K2–R2, K3–R3, and K4–R4 at each of the crosspoints N1, N2, N3, and N4. As a result of coexistent displacement of the two crossbars at one of these crosspoints, one of the contact arms K1, K2, K3, or K4 will be deflected to open one of the normally-closed switching elements. As in the case of FIGURE 1, the switching element operated will be determined by the respective coexistent directions of displacement of the crossbars at the selected crosspoint. When the carrier bars C1 and C2 and the actuator bars A1 and A2 are in their normal undisplaced positions, the switching elements K1–R1, K2–R2, K3–R3, and K4–R4 are held in their normally closed positions on account of the resilient force exerted by the resilient contact arms K1, K2, K3, and K4 against their respective mating contact rods R1, R2, R3, and R4. For example, in FIGURE 4, crosspoint N4 has been selected, and the normally closed switching element K2–R2 has been opened as the result of coexistent displacements of actuator bar A2 and carrier bar C2 from their respective normal positions. Hence, the downward movement of actuator bar A2 has shifted the actuator pin P1 into actuating position with respect to contact arms K1 and K2, and the displacement of carrier arm C2 has shifted contact arm K2 to the right, with the result that it has become deflected against P1 and rotated in a counterclockwise direction. This deflection has been sufficient to separate the contact surfaces of contact arm K2 and contact rod R2, so that the electrical circuit which normally exists between the surfaces is interrupted.

The ingenious structural features of this novel selector switch are represented even more clearly in the exploded view of FIGURE 5. In particular, this view discloses clearly the interrelationship between the connector unit, and the matrix-contact arm assembly.

The connector unit 20 is comprised of a rectangular base member 21 on which is mounted a multiplicity of contact rods 22 in mutually spaced-apart, and perpendicular relation with respect to front surface 21*a*. The contact rods 22 are arranged in groups of four, designated R1, R2, R3, and R4, and each of these groups is disposed for cooperation with each set of contact arms K1, K2, K3, and K4 disposed on the carrier bars C1 or C2. As represented best in FIGURE 6, each of the contact rods 22 effectively extends through the base member 21 to the rear surface 21*b* where it is coupled to one of the electrical conductors 23. The other terminal 3 (FIGURE 1) for each of the circuits including the conductors 23 and the contact rods 22 is common to all, and is coupled in any convenient fashion to all of the carrier bars C1 and C2 of a matrix-contact arm assembly. Four guide rods 26 secured, respectively, adjacent to the four corners of base member 21, extend perpendicularly from its front surface 21*a*. The guide rods 26 position the connector unit 20 on the frame 10 of the matrix-contact arm assembly for safe and easy installation and removal.

Figure 13:
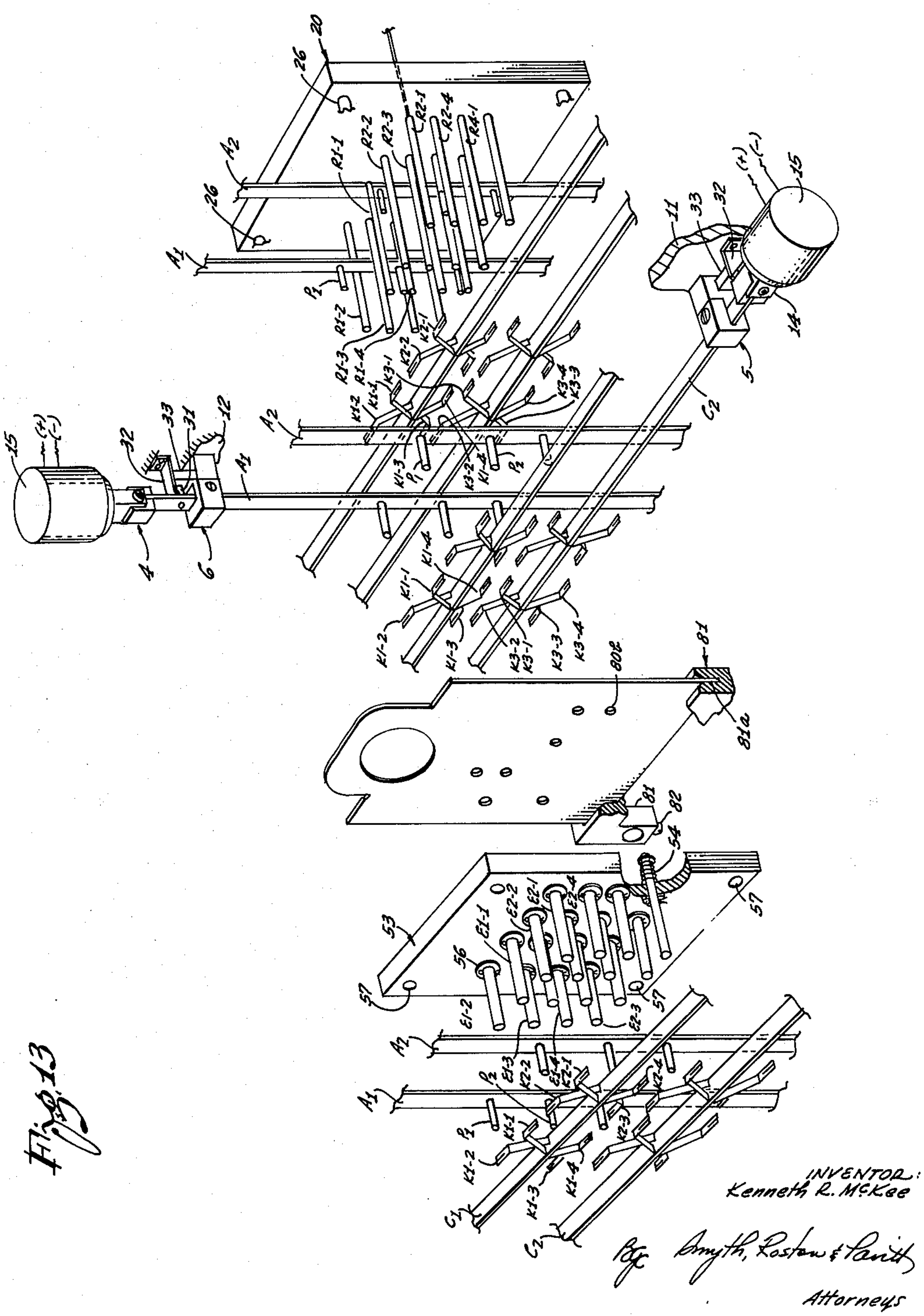
FIGURE 13 is an exploded view of the internally-programmable selector switch of FIGURE 12.
Figures 14, 15, 16:
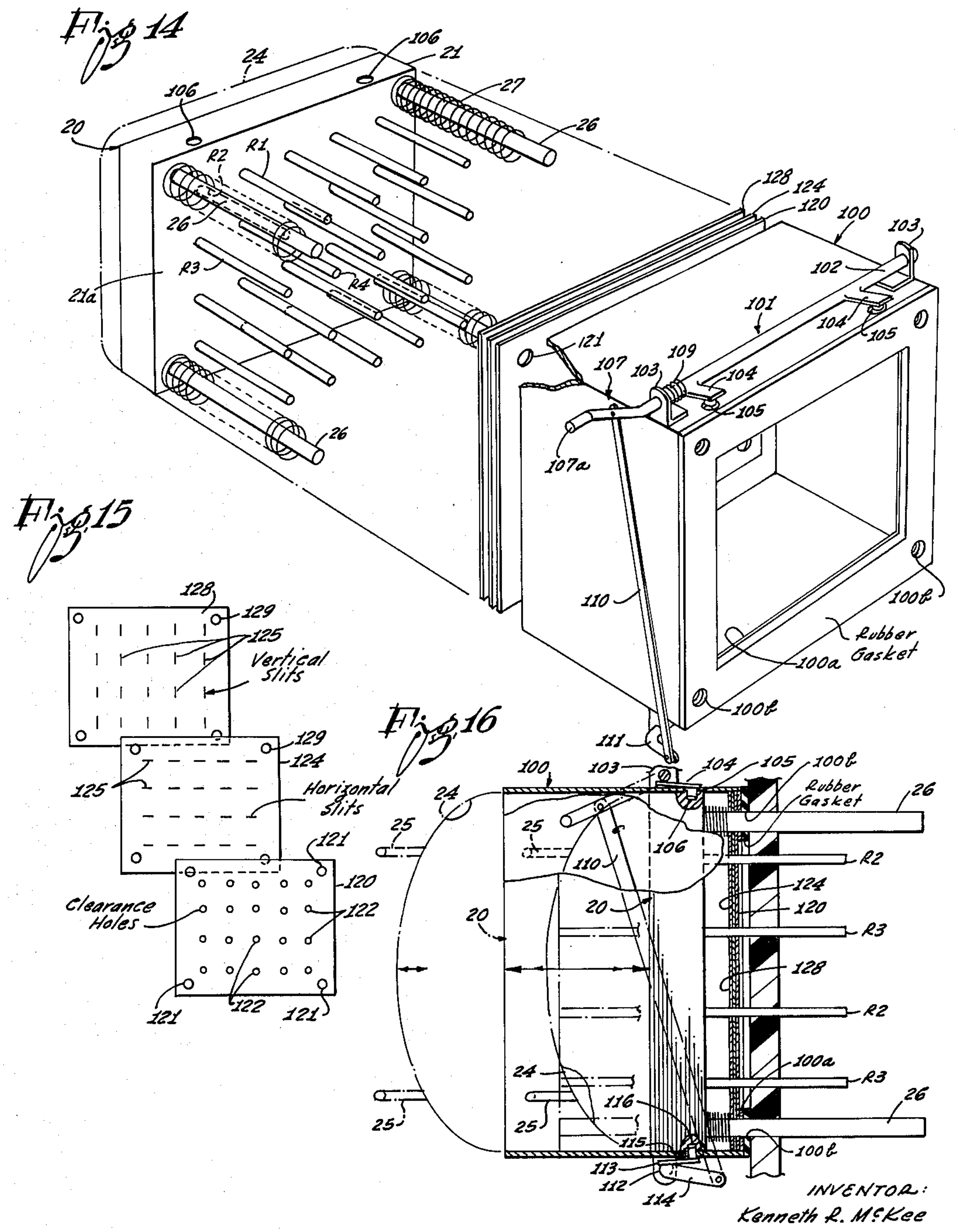
FIGURE 14 is an exploded view of a connector unit for this switch having a unique protective housing.
FIGURE 15 is a more detailed view of a perforated gasket and sealing arrangement for the connector housing of FIGURE 14.
FIGURE 16 is a side elevation in partial cross-section showing the connector unit of FIGURE 14 in its retracted and operating positions within the protective housing.

A cover 24 for the rear surface 21*b* of base member 21 is adapted to be secured removably in any conventional manner. As shown in FIGURES 13 and 15, the cover 24 may be provided with handles 25 to facilitate the installation and removal of connector unit 20.

As shown in FIGURE 5, the actuator bars A1 and A2 and C1 and C2 and their respective sets of contact arms and actuator pins are disposed in mutually spaced-apart and perpendicular relation to form a matrix-contact arm assembly for use in conjunction with connector unit 20. The basic structure and function of this matrix is essentially the same as that described above with reference to FIGURE 1. An additional matrix-contact arm assembly is represented in FIGURE 5 as being comprised of actuator bars A1' and A2' and carrier bars C1' and C2'. This representation illustrates the possibility of using multiple matrixes with the single connector unit 20. The number of matrixes which may be used with a single connector unit may be indefinitely large. The only requirements are that the contact rods 22 be made long enough to extend through all of the matrixes, and that an adequate rod-supporting structure be provided to prevent the contact rods 22 from bending or sagging. It should be understood, of course, that each group of four contact rods R1, R2, R3, and R4 should be related to corresponding crosspoints and sets of contact arms in each matrix.

The advantage of using a multiplicity of matrixes is that a multiplicity of contact rods 22 of connector unit 20 equal to the number of matrixes associated with the connector unit 20 may be selected simultaneously. This permits several obvious circuit variations which would be difficult, if not impossible, with a switch having a single matrix.

Figure 6:
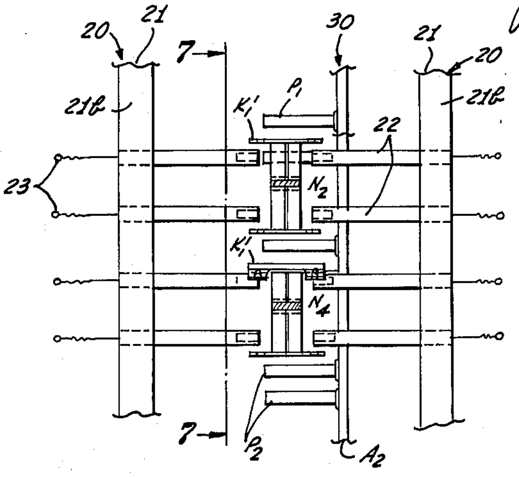
FIGURE 6 is a side view of a four bar selector switch in accordance with a further modification of this invention wherein two connector units, mounted on opposite sides of a single matrix, make it possible to establish or disestablish circuits through the coaxially-aligned contact rods of the connector units.
Figure 7:
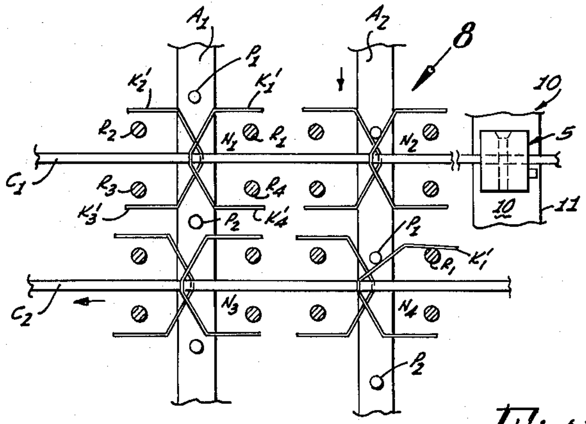
FIGURE 7 is a plan view of the modified selector switch of FIGURE 6, illustrating the essential similarity between the operating principles of the switching elements of this modification and those of the embodiments of FIGURES 1, 4 and 6, inclusive.

Further modifications of the selector switch of this invention are represented in FIGURES 6 and 7. In accordance with this modification, the matrix-contact arm assembly is provided with contact arms K1', K2', K3', and K4', each having spaced-apart contact surfaces capable of bridging the gap between the extremities of the contact rods 22 of two connector units 20 mounted on each side of a matrix-contact arm assembly 30. A selector switch in accordance with this modification of the invention is capable of establishing or disrupting the continuity of a selected one of a multiplicity of circuits, each of which includes a contact rod 22 of one of the connector units 20, a bridging contact arm K1', K2', K3', and K4', and a coaxially-aligned contact rod 22 of the other connector unit 20.

The operation of the switching elements associated with the crosspoints N1, N2, N3, and N4, is essentially the same as that explained above in connection with the basic embodiment represented in FIGURE 1. In FIGURE 7, for example, a matrix-contact arm assembly has been actuated so that the carrier bar C2 and actuator bar A2 forming crosspoint N4 have been displaced to the left and downward, respectively. As a result, the actuator pin P1 has engaged and deflected contact K1' against contact pins R1 of the connector units 20. The manner in which contact arm K1' inter-connects the contact rods R1 and connectors 20 is represented at crosspoint N4 of FIGURE 6.

Figure 8:
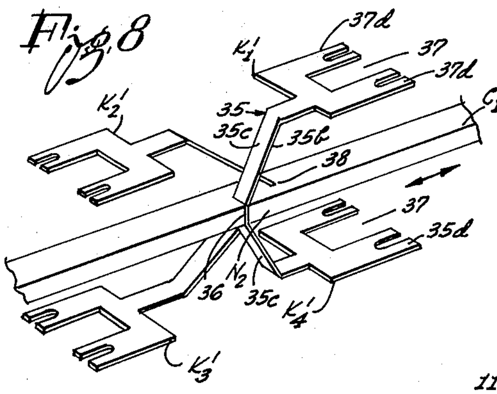
FIGURE 8 is an enlarged perspective view representing the set of four modified contact arms designated by the arrow 8 of FIGURE 7.

The structural features of the modified contact arms K1', K2', K3', and K4' are represented in FIGURE 8. As depicted in this figure, contact arms K1' and K4' are formed from a single flat piece 35 of resilient, highly-conducting material having broad end portions 35*a* interconnected with a relatively narrow intermediate portion 35*b*. The narrow portion 35*b* is secured at the center in a transverse slot 36 provided in one edge of carrier bar C1 at a location spaced from but adjacent to crosspoint N2. The narrow portion 35*b* is bent at slot 36 toward crosspoint N2 to form the diagonal segments 35*c*. The narrow portion 35*b* is provided with other bends in the same direction as diagonal segments 35*c* in order to place the broad portions 35*a* into parallel relation with the sides of the rectangular carrier bar C1. The broad portions 35*a* have slots 37 which form two contact prongs 35*d* for each of the arms K1', . . . K4'. The prongs 35*d* are bifurcated and plated with gold to provide a good electrical coupling with the respective contact surfaces of the two coaxially-aligned contact rods R1.

The contact arms K2' and K3' are formed in the same manner as the arms K1' and K4'. In this case, however, the direction of the bends is reversed, and the arms themselves are secured in a transverse slot 38 provided in the opposite edge of carrier bar C1 and on the opposite side of crosspoint N2.

Figure 10:
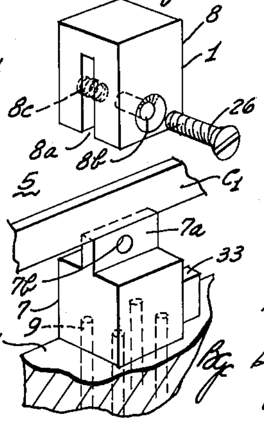
FIGURE 10 is an exploded view of the bearing block 5 of FIGURE 7.

A suitable mounting structure for the actuator and carrier bars is represented in a portion of FIGURE 7, and in FIGURES 9 and 10. The general requirements for this mounting structure are that it have means for slidably supporting each of the actuator bars A and the carrier bars C on a frame 10, that it have further means to establish a normal, or undisplaced position of each bar, and that it include suitable stops to limit the amplitude of displacement in either of the two longitudinal directions from the normal position.

A structural arrangement for achieving these objectives, applicable to both the actuator bars A and the carrier bars C is depicted in FIGURE 9. Here, the actuator bar A2 is shown mounted slidably in identical bearing blocks 6 secured by screws 13 to the upper and lower frame members 12 of frame 10. The extremities of the actuator bar A2 are coupled to the plungers 15*a* of solenoids 15 by coupling blocks 4, and the extremities of the carrier bars C1 and C2 are secured to the plungers 15*a* of solenoids 15 by coupling blocks 14 (FIGURE 1). Two stop pins 31 secured to the actuator bar A2 in a position between bearing blocks 6 and couplings 4 limit the amplitude of displacement in either direction. Leaf springs 32 are secured to frame members 12 to exert force in opposite directions against stop pins 31. Each bearing block 6 is provided with a boss 33 against which the springs 32 rest whenever actuator bar A2 is in its normal position. Thus, in FIGURE 9, when lower solenoid 15 is energized to displace actuator bar A2 downwardly from its normal position, the lower spring 32 likewise is deflected downwardly while the upper spring 32 rests against boss 33. When the lower solenoid 15 is deenergized, the lower spring 32 operating against the lower stop pin 31 will exert a force against bar A2 sufficient to return it to its normal position. Likewise, actuation of the upper solenoid 15 will displace the actuator bar A2 upwardly, so that the upper stop pin 31 will engage and deflect the upper return spring 32. The amplitude of the upward displacement will be limited by the lower stop pin 31 when it engages the lower surface of bearing block 6.

As portrayed in FIGURE 1, the coupling blocks 14 comprise a generally rectangular piece of metal or plastic secured to the yokes 15*b* of solenoid plungers 15*a* by the pin 15*c*. A recess 14*a* is provided in the opposite surface of each block 14 to accommodate the ends of carrier bars C1 and C2. Threaded screws 14*b* having smooth shank portions engage the ends of carrier bars C1 and C2 to secure them in position in recesses 14*a*.

The coupling blocks 4 fasten the ends of actuator bars A1 and A2 to the yokes 15*b* of plungers 15*a* of solenoids 15. The blocks 4 are like the blocks 14 except that the recesses for receiving the ends of carrier bars C1 and C2 are parallel to pins 15*c* rather than perpendicular as in the former case, and the screws 4*b* are perpendicular rather than parallel as in the case of screws 14*b*.

The structural details of the bearing block 5 for the carrier bars C are represented in FIGURE 10 as being comprised of a base 7 and a clamp 8. The base 7, secured to the side members 11 with screws 9, for example, has a flange 7*a* longitudinally disposed across its upper surface, and a boss 33 which limits the return springs 32 and establishes the normal, or undisplaced, position of carrier bars C. The clamp 8 of bearing block 5 is provided with a rectangular longitudinal slot formed in its lower surface. This slot is long enough to accommodate the width of the rectangular carrier bar C1 and flange 7*a* so that the former will be held in firm but slidable engagement within the assembled bearing block 5. The clamp 8 is provided with a hole 8*b* mating with hole 7*b* of the base member 7 and a threaded hole 8*c* to accommodate the mating threads of screw 26. The bearing blocks 5 may be molded from nylon or Teflon, or similar electrical insulating materials. It should be understood, of course, that the only essential difference between the bearing block 5 for providing slidable support for the carrier bars C and the bearing block 6 for supporting actuator bars A is that, in the former case, the clamp 8 would be provided with a T-shaped slot so that the broad dimension of the actuator bars A will be generally parallel to the surface of frame 10.

Figure 11:
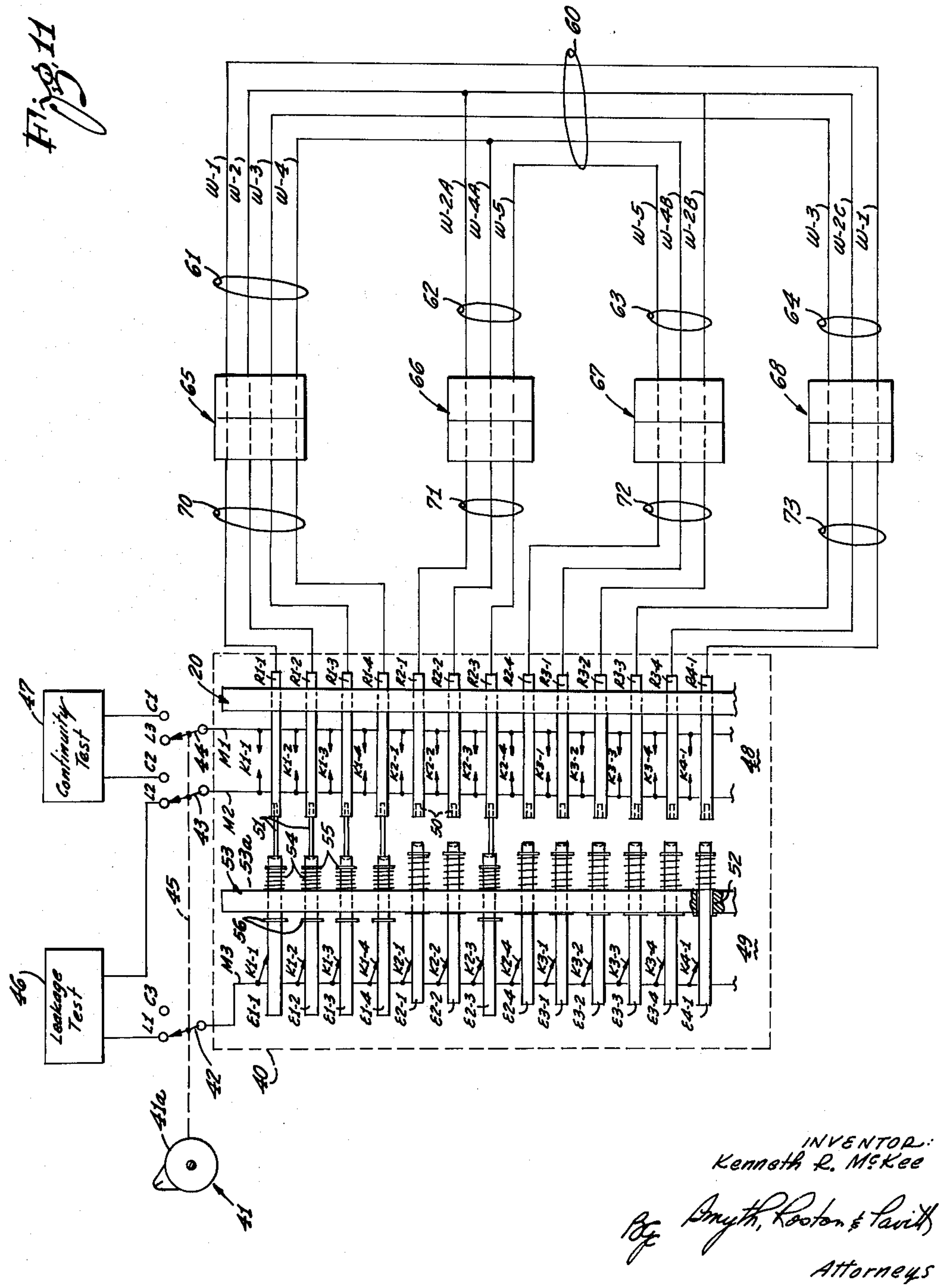
FIGURE 11 is a schematic block diagram representing circuitry which may be utilized with an internally-programmed switch for testing insulation leakage and continuity in multi-conductor cables.

An important application of the selector switch of this invention is represented in the schematic-block diagram of FIGURE 11. In this application, an internally-programmable selector switch 40 is utilized for the purpose of conducting continuity and insulation leakage tests on a cable harness 60 having branches 61, 62, 63, and 64. With a selector switch of the type represented within the dotted lines 40 either a continuity or an insulation leakage test can be performed on cable harness 60 depending upon the setting of a two-position test selector switch 41. The switch knob 41*a* is coupled to contact arms 42, 43, and 44 by a shaft 45. Consequently, rotation of the selector knob 41*a* to its extreme counterclockwise position will close the switch arms 42, 43, and 44 against switch terminals L1, L2, and L3, respectively. This has the effect of coupling switch 40 to the leakage test unit 46. Rotation of control knob 41*a* to its extreme clockwise position moves the contact arms 42, 43, and 44 from terminals L1, L2, and L3 to terminals C1, C2, and C3. This has the effect of coupling switch 40 to the continuity test unit 47. Inasmuch as conventional leakage test instrumentation and continuity test instrumentation, represented by blocks 46 and 47, respectively, are well known in the art, it appears unnecessary to describe these portions of the test circuit in detail.

In general, the modified selector switch 40 comprises a dual-matrix unit 48 having two matrices M1 and M2 in association with a removable connector unit 20, and a unitary connector-matrix assembly 49 having a single matrix M3 mounted fixedly on matrix frame 53. Each of the matrices M1 and M2 have contact arms K1–1, K1–2, K1–3, and K1–4 associated with first corresponding crosspoints of each matrix, contact arms K2–1, K2–2, K2–3, and K2–4, associated with second corresponding crosspoints of matrices M1 and M2, and so forth. The removable connector unit 20 has contact rods R1–1, R1–2, R1–3, and R1–4 disposed in cooperative relation with the contact arms of first corresponding crosspoints of matrices M1 and M2, contact rods R2–1, R2–2, R2–3, and R2–4 disposed, respectively, in cooperation with the respective contact arms of the second corresponding crosspoints of matrices M1 and M2, and so forth. The switching elements of matrices M1 and M2, each comprised of a contact arm and its cooperating contact rod, are normally open.

The unitary connector-matrix assembly 49 is made up of a matrix M3 in association with spring-mounted extension rods E1–1, E1–2, E1–3, and E1–4 disposed in cooperative relation with the first crosspoint of matrix M3, spring-mounted extension rods E2–1, E2–2, E2–3, and E2–4 disposed in cooperative relation with the contact arms at the second crosspoint of matrix M3, and so forth. The switching elements of matrix M3, each comprised of a contact arm and its cooperating extension rod, are normally closed.

The extension rols E1–1, E1–2 . . . of unitary connector-matrix assembly 49 are in coaxial relation with the corresponding contact rods R1–1, R1–2 . . . of the dual matrix unit 48. Furthermore, the unitary connector-matrix assembly 49 is mounted for movement toward and away from the dual matrix unit 48.

The essential structure and operation of dual matrix unit 48 is the same as that described previously with reference to FIGURES 1 and 5. The only difference between the dual matrix unit 48 and the unit shown in FIGURE 5 is that contact rods R1–1, R1–2 . . . of the former have threaded holes 50 in their extremities to accommodate the mating threads provided on the ends of extension pins 51.

The operation of the unitary connector-matrix assembly 49 is the same as that described above with reference to FIGURE 4. The essential structure has been modified, however, to provide for longitudinal displacement of extension rods E1–1, E1–2, . . . sufficient to establish good contact between extension pins 51 and the extremities of the extension rods whenever the unitary connector-matrix assembly 49 is pushed into cooperative relation with the dual matrix unit 48. The extremities of extension rods E1–1, E1–2, . . . engaged by extension pins 51 may be made concave to facilitate a good electrical connection.

To insure that the extension rods R1–1, R1–2, . . . of the unitary connector-matrix assembly 49 will engage any extension pins 51 installed on dual matrix unit 48 with effectively equal pressures acquired for producing effectively equal electrical contact resistances, they are mounted slidably in holes 52 provided in matrix frame 53, and spiral compression springs 54 are installed on the rods between the front surface 53*a* of matrix frame 53 and retaining washers 55 secured in place near the respective extremities of the rods E1–1, E1–2, . . . . The compression springs 54 exert an axial thrust in the direction of the concave extremities of extension rods E1–1, E1–2, . . . . The limit washers 56, however, limit the movement of rods E1–1, E1–2, . . . resulting from springs 55. Hence, the spring-mounted extension rods E1–1, E1–2, . . . will have a normal position with respect to matrix frame 53. Therefore, when the unitary connector-matrix assembly 49 is pushed toward the dual matrix unit 48, the various extension pins 51 of the latter unit will engage the concave extremities of extension rods E1–1, E1–2, . . . of unitary connector-matrix assembly 49, displacing them from their normal position. This arrangement provides virtually uniform pressure against the ends of extension pins 51, with the result that the contact resistance at each point of engagement effectively will be equal. The cable harness 60 undergoing tests may be coupled to adapter connectors 65, 66, 67, and 68 of conventional design. These connectors, in turn, may be coupled to the contact rods R1–1, R1–2, . . . of connector unit 20 with adapter cables 70, 71, 72, and 73, respectively.

To perform an insulation leakage test on the hypothetical cable harness 60, the test selector knob 41 is rotated to its extreme counterclockwise position. Inasmuch as extension pins 51 have been installed between extension rods E1–1, E1–2, E1–3, E1–4, and E2–3 of the unitary assembly 49 corresponding contact rods R1–1, R1–2, R1–3, R1–4, and R2–3 of dual matrix unit 48, a circuit is completed between each wire of the cable harness 60 via the normally closed contact arms K1–1, K1–2, K1–3, K1–4, and K2–3, and the contact arm 42 of the test selector switch to terminal L1 of leakage test unit 46 whenever the unitary assembly 49 is pushed forward so that the coaxially-aligned extension rods of the latter engage the ends of extension pins 51 of dual matrix unit 48. Thus, to test whether any insulation leakage exists between conductor W–1 of cable harness 60 and the other conductors of the harness, the matrices M2 and M3 of selector switch 40 are programmed to operate the switching element of each made up, in the first instance, of contact arm K1–1 and contact rods R1–1, and, in the second instance of contact arm K1–1 and extension rod E1–1. This, of course, involves displacement of the respective carrier bar and actuator bar comprising the first crosspoints of matrices M2 and M3 in the directions required to actuate these two switching elements in lieu of the other three also associated with the crosspoints. As a result of actuating these particular switching elements, the normally-closed contact arm K1–1 of unitary assembly 49 is opened so that the conductor W–1 no longer is connected to contact arm 42 of the test selector switch 41. At the same time, the contact arm K1–1 of the matrix M2 of the dual matrix unit 48 is closed against the contact rod R1–1 of connector unit 20. This has the effect of coupling conductor W–1 to the terminal L2 of leakage test unit 46 via the contact arm 43 of test selector switch 41. Hence, a high unidirectional voltage from leakage test unit 46 may be applied to conductor W–1 via terminal L2, switch arm 43 and the closed switching element of matrix M2. Any current leaked from this conductor to any of the other conductors of cable harness 60 will flow through the normally closed contacts K1–1, K1–2, . . . of matrix M3 via switch arm 42 to the terminal L1 of leakage test unit 46.

The existence of insulation leakage between any one of the other conductors of cable harness 60 and the remainder of the conductors of the harness may be detected in a similar manner. For example, the matrices M1, M2, and M3 may be programmed so that the actuator and carrier bar of crosspoint 2 will be displaced in the direction required to close the contact arms K2–K4 of matrix M2 while opening contact arm K2–4 of M3. As described above in the case of conductor W–1, this operation of the matrices will have the effect of coupling conductor W–5 to the high voltage side of leakage test unit 46 via terminal L2, switch arm 43 of test selector switch 41, and the closed contact arm K2–3 of matrix M2, while simultaneously disconnecting this conductor from the sensing terminal L1 of the leakage test unit 46 by opening contact arm K2–3 of matrix M3. In a similar manner, insulation leakage of conductors W–2, W–3, and W–4 of cable harness 60 may be checked by operating in succession the switching elements associated with contact arms K1–2, K1–3, and K1–4 of matrices M2 and M3, respectively.

To perform continuity and resistance tests on the conductors of cable harness 60, the test selectors switch 41 is rotated to its extreme clockwise position. This has the effect of coupling contact arms 43 and arm 44 to the terminals C1 and C2 of the continuity test unit 47, and disconnecting the matrix M3 of the unitary assembly 49 at contact arm 42. Hence, the unitary assembly 49 is not used for these tests.

The continuity of conductor W–1 is checked merely by programming the matrix M1 to close its contact arm K1–1 against contact rod R1–1 while simultaneously operating crosspoint 4 of matrix M2 to close contact arm K4–1 against contact rod R4–1. This operation of the selector switch 40 completes a circuit from terminal C1 of the continuity test unit 47 via contact arm 44 of test selector switch 41, contact arm K1–1 of matrix unit M1, contact rod R1–1, adapter connector 65, conductor W–1 of cable harness 60, adapter connector 68, contact rod R4–1, the closed contact arm K4–1 of matrix M2, contact arm 43 of test selector switch 41, and terminal C2 of the continuity test unit 47. Likewise, the continuity and resistance of conductor W–2 and its branches W–2*a*, W–2*b*, and W–2*c* may be checked merely by operating the first crosspoint of matrix M1 to close its contact arm K1–2 against contact rod R1–2, and then succesively operating crosspoint 2 of matrix M2 to close its contact arm K2–1 against contact rod R2–1 in order to check branch W–2*a*; actuating crosspoint 3 to close its contact arm K3–2 against contact rod R3–2 in order to check branch W–2*b*; and finally operating crosspoint 3 of matrix M2 to close its contact arm K3–4 against contact rod R3–4 in order to check connector branch W–2*c*. Continuity tests of the remaining conductors and their branches may be conducted in succession in a similar manner.

Figure 12:
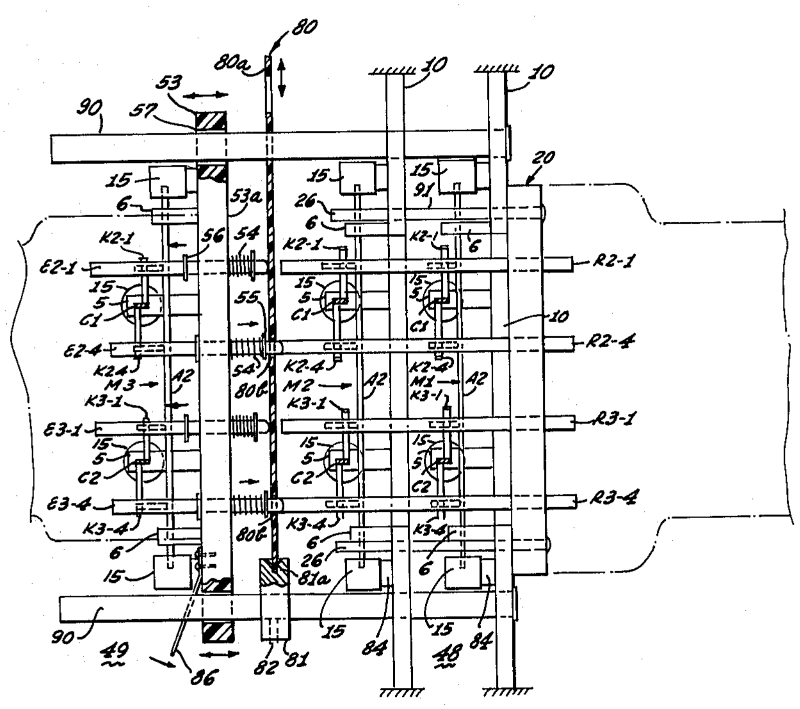
FIGURE 12 is a side elevation in partial cross-section of an internally-programmable modification of the selector switch of this invention.

The essential structural elements of an internally-programmable selector switch of the type used in the insulation leakage and continuity test circuit of FIGURE 11 is represented in FIGURES 12 and 13. The selector switch of FIGURES 12 and 13, however, has been modified slightly to illustrate the manner in which a switch of this type may be programmed internally through use of a punched card in lieu of extension pins 51 applied for this purpose in selector switch 40 of FIGURE 11.

The internally-programmable selector switch of FIGURES 12 and 13 is made up generally of a dual matrix unit 48, a reciprocable unitary connector-matrix assembly 49, and a punched card frame 81, all mounted in a housing 83. Support for the punched card frame 81 and the unitary connector-matrix assembly 49 is provided by the respective frames 10 of matrices M1 and M2, and four lateral supporting rods 90 mounted in matrix frames 10.

The dual matrix unit 48 is made up of matrices M1 and M2 and a removable connector unit 20. The connector unit 20 is provided with a plurality of contact rods R1–1, R1–2, . . . arranged in groups of four for cooperation with the crosspoints of matrices M1 and M2. Each of the contact rods R1–1, R1–2, . . . is long enough to extend through both of the matrices M1 and M2. The connector unit 20 also is provided with four guide rods 26 which facilitate installation and removal of the connector unit 20 without danger of bringing the contact rods into damaging impact with matrices M1 or M2. The guide rods 26 are accommodated in guide tubes 91 mounted near each corner of the respective frames 10 of matrices M1 and M2.

Each of the matrices M1 and M2 functions like the matrix unit described above with reference to FIGURE 1. Each is formed of two actuator bars A1 and A2 and two carrier bars C1 and C2 which can be displaced longitudinally and bidirectionally by energizing one of the solenoids 15 coupled to an actuator bar and one of the solenoids 15 coupled to the extremities of a carrier bar. The solenoids 15 are mounted in any conventional fashion on the respective frames 10 of matrices M1 and M2. The actuator bars A1 and A2 are supported slidably on matrix frames 10 by bearing blocks 6, and the carrier bars C1 and C2 likewise are supported slidably in bearing blocks 5 secured to matrix frames 10.

The switching elements of matrices M1 and M2, each made up of one of the contact arms K1–1, K1–2, . . . and a cooperating one of the contact rods R1–1, R1–2, . . . normally are open, and are closed successively in any order when the two bars of the crosspoints are displaced. The unitary connector-matrix assembly 49 is mounted slidably on support rods 90 so that it may be moved back and forth between a forward position where it is in cooperative relation with respect to the dual matrix unit 48, and a retracted position where it is spaced-apart from dual matrix unit 48 sufficiently to enable the insertion or removal of the punched card 80.

The unitary connector-matrix assembly 49 is comprised generally of a matrix frame 53 provided with four holes 56 for facilitating its mounting on the support rods 90, matrix M3 made up of carrier bars C1 and C2, and actuator bars A1 and A2, and a plurality of spring mounted, longitudinally-displaceable extenison rods E1–1, E1–2, . . . arranged in groups of four for cooperation with the contact arms K1–1, K1–2, . . . of the matrix M3. The matrix M3 of unitary assembly 49 is supported on matrix frame 53. The various switching elements of matrix M3 normally are closed, and may be opened one at a time by displacing one of the carrier bars C1 or C2 and one of the actuator bars A1 or A2. The actuator bars A1 and A2 are supported slidably in bearing blocks 6 secured, in turn, to frame 53, and the carrier bars C1 and C2 are supported slidably in bearing blocks 5 likewise secured to frame 53. Each end of the carrier bars C1 and C2, and the actuator bars A1 and A2, is coupled to a solenoid 15 secured to frame 53.

The extension rods E1–1, E1–2, . . . of the unitary assembly 49 are biased by compression springs 54 to occupy a normal position wherein a limit washer 56 is juxtaposed against the rear surface of frame 53. Application of a force, at the righthand extremity of the displaceable extension rods E1–1, E1–2, . . . will displace these rods longitudinally against spiral compression springs 54.

A latch 86, of any conventional design, may be utilized to maintain the unitary assembly 49 in its forward position where its extension rods R1–1, R1–2, . . . will connect with extremities of the contact rods R1–1, R1–2, . . . of connector unit 20 coaxially-aligned with holes in punched card 80.

A frame 81 having guide slots 81*a* is secured in a fixed position on support rods 90 to hold the insertable programming card 80. This card is provided with a handle 80*a* to facilitate its insertion and removal from the guide slots of frame 81 when the latch 86 is open, and unitary assembly 49 has been retracted. The card 80 may be provided with occasional holes 80*b* in positions corresponding to the extremities of various ones of the coaxially-aligned contact rods R1–1, R1–2, . . . of the connector unit 20 and the extension rods E1–1, E1–2, . . . of unitary assembly 49. These holes, therefore, effectively program the switching elements of the switch for the requirements of various applications; for example, the insulation leakage and high-voltage tests described above.

Once a punched card 80 has been inserted in frame 81, the reciprocable unitary assembly 49 is pushed along supporting rods 90 until the extremities of the displaceable extension rods E1–1, E1–2, . . . pass through the holes of the punched card and physically engage the extremities of coaxially-aligned contact rods R1–1, R1–2, . . . of connector unit 20. As the unitary assembly 49 is moved further to the right, spiral springs 54 are compressed so that the contact pressures between the coaxially-aligned contact rods are approximately equal.

It should be noticed that matrices M1 and M2 may be omitted in order to provide an internally-programmable selector switch of simplified design. Moreover, the switching elements of matrix M3 may be designed to be normally open instead of normally closed.

The connector unit 20 of a selector switch in accordance with this invention is shown provided with a unique protective housing 100 in FIGURES 14, 15, and 16. The housing 100 has cross-sectional dimensions slightly larger than the dimensions of base 21 of the connector unit 20 to permit the edges of the latter to slide freely back and forth against the inner wall surfaces of housing 100. The front wall of housing 100 is provided with a rectangular opening 100*a* through which the contact rods R1, R2, R3, R4, . . . may extend when the connector unit 20 is pushed to its forward position in housing 100. The front wall, likewise is provided with four holes 100*b* to accommodate guide rods 26 of connector unit 20. Spiral compression springs 27 are provided on guide rods 26 to maintain connector unit 20 in a normally-retracted position within housing 100.

When the connector unit 20 is in its retracted position within housing 100, the contact rods R1, R2, . . . are enclosed entirely within housing 100 and protected from accidental deformation and exposure to contaminants. A latch assembly 101 is provided adjacent the front edge of housing 100 to make it possible to latch connector unit 20 in its forward position. The latch assembly 101 may be formed from a shaft 102 mounted rotatably in flanges 103 which are integral with the side walls of housing 100. The rotatable shaft 102 is provided with two prongs 104 which are arranged for insertion and retraction from latch holes 105 provided in the top wall of housing 100. The prongs 104 are long enough to pass through the holes 105 and enter holes 106 in the upper edge of base 21 of connector unit 20. A crank 107 having a handle 107*a* is secured to one end of shaft 101 to facilitate the rotation required to achieve insertion and retraction of the prongs 104 with respect to the holes 105 and 106. A spiral torsion spring 109, having one end secured to rotatable shaft 101 and its other end secured to flange 103, is biased to maintain the prongs 104 normally inserted in holes 105.

A similar latching arrangement, provided on the bottom wall of housing 100 also is operated by crank 107 via connecting rod 110 and crank 111. The bottom latch also comprises shaft 112 rotatably mounted in flanges 113, and having prongs 114 which may be retracted from holes 115 provided in the bottom wall of housing 100.

With the aforedescribed latching assemby 101, the crank 107 may be rotated counterclockwise a slight distance to retract prongs 104 and 114 from the holes 105 of housing 100. When this is done, the connector unit 20 may be pushed forward to expose contact rods R1, R2, . . . and to achieve a coaxial relation between holes 105 of housing 100 and holes 106 of the connector base 21. Once this coaxial alignment is achieved, crank 107 may be released and the prongs 104 and 114 will be reinserted as a result of torsion of the spring 109.

As shown best in FIGURE 15, the opening 100*a* of housing 100 may be provided with a rigid cover 120 having four holes 121 to accommodate the guide rods 26 of the connector unit 20, and a plurality of holes 122 coaxially aligned with contact rods R1, R2, . . . of connector unit 20 so that the latter can slide freely in and out of housing 100.

To insure that all openings of housing 100 are sealed when the connector unit 20 is in its retracted position, gaskets 124 and 128, made of resilient material, may be secured in overlying relation to one of the surfaces of cover 122. Gaskets 124 are provided with horizontal slits 125 positioned to extend diametrically across each of the holes 122 of cover 120. The gaskets 124 and 128 also have holes 129 to accommodate the guide rods 26 of connector unit 20. With this gasket arrangement, liquid and dustproof seals are established around the contact rods R1, R2, . . . of connector unit 20. At the same time, these rods may slide freely through holes 122 of cover 120. Upon being retracted by springs 27 when latch assembly 101 is operated, the slits close. This seals the holes 122 of cover 120 against the entry of dust, moisture and other harmful elements, and also helps keep the contact surfaces of the contact rods R1, R2, . . . clean.

It should be understood, of course, that it is unnecessary to provide gaskets for the holes 129. This is the case because the guide rods 26 always will be present therein. Furthermore, they will extend through the holes 129 a short distance when connector unit 20 is in its fully retracted position within housing 100. This is desirable, of course, to facilitate the positioning of connector unit 20 on the matrix during installation.

The representations in the drawings and the foregoing text are intended merely to facilitate the practice of this invention by persons skilled in the art, not to restrict its scope. Moreover, it is obvious that many variations and substitutions may be made with respect to the embodiments described above while remaining within the scope of this invention as set forth in the following claims.

I claim:

1. A selector switch including:

A actuator bars mounted for longitudinal displacement;

C carrier bars mounted for longitudinal displacement in crossing relation to the actuator bars to form a matrix having at least one crosspoint, where A and C represent integers;

a plurality of pins coupled to the actuator bars for displacement with the actuator bars;

a plurality of resilient contact arms made from an electrically conductive material and coupled to the carrier bars for displacement with the carrier bars and, regardless of any displacement of the carrier bars, for engagement by the pins upon a displacement of the pins;

means coupled to the actuator bars for obtaining a selective longitudinal displacement of individual ones of the actuator bars;

means coupled to the carrier bars for obtaining a selective longitudinal displacement of the carrier bars; and conductive means disposed in spaced relationship to the resilient contact means between the actuator bars and the carrier bars for providing selective engagement and electrical conductivity with the contact arms in accordance with the individual engagement of the arms by the pins.

2. A selector switch including:

A actuator bars mounted for longitudinal displacement;

C carrier bars mounted for longitudinal displacement in crossing relation to the actuator bars to form a matrix having at least one crosspoint, where A and C represent integers;

a plurality of actuating means individually mounted on the different actuator bars for displacement with the actuator bars, a plurality of conductive means disposed in physically displaced relationship to the actuator bars and the carrier bars, a plurality of resilient contact arms individually carried by the different carrier bars for displacement with the carrier bars and disposed relative to the actuating means for resilient engagement by the actuating means, regardless of any displacement of the carrier bars, upon a displacement of the actuating means and for a selective wiping engagement with the conductive means upon a displacement of the carrier bars and in accordance with the engagement by the actuating means, each of the resilient contact arms having a first portion extending in a direction transverse to the actuator bars and the contact bars to receive the actuating means on the actuator bars and having a second portion extending in a direction substantially parallel to the carrier bars to engage the conductive means, means operatively coupled to the carrier bars for obtaining a selective displacement of the carrier bars, and means operatively coupled to the actuator bars for obtaining a selective displacement of the carrier bars.

3. A selector switch including:

A actuator bars disposed in spaced-apart relation;

C carrier bars disposed in crossing relation with respect to the actuator bars, to form a matrix having a plurality of crosspoints, where A and C represent integers;

means at the crosspoints including a plurality of resilient contact arms individually coupled to the carrier bars for movement with the contact bars and having first portions extending in a direction transverse to the actuator bars and the carrier bars and having second portions extending in a direction substantially parallel to the carrier bars;

a plurality of contact rods removably disposed in cooperative relation with the contact arms for engaging the second portions of the contact arms upon a displacement of the actuator bars and regardless of any displacement of the carrier bars;

means coupled to the actuator bars in displaced relationship with the contact arms for establishing in response to displacements of the particular actuator bar and the particular carrier bar defining a particular crosspoint, a connection between a particular one of the contact arms and a particular one of the contact rods at the particular crosspoint;

means coupled to the carrier bars for displacing the particular carrier bar; and means coupled to the actuator bars for displacing the particular actuator bar.

4. A selector switch including:

a matrix having A actuator bars disposed for longitudinal displacement and C carrier bars disposed for longitudinal displacement in transverse and cooperative relation with respect to the actuator bars, so that N crosspoints are formed between the actuator and carrier bars, where A, C and N represent integers;

a plurality of elongated resilient contact arms disposed in groups, the arms in each group being secured to the carrier bar adjacent to an individual one of the crosspoints;

a plurality of contact rods disposed in groups in contiguous relation with the contact arms in the different groups;

a plurality of actuator pins disposed in groups on the actuator bars in actuating relation to the contact arms in the associated groups;

first means coupled to the actuator bars for displacing the latter bars selectively, longitudinally and bidirectionally, from a normal position to move the actuator pins into actuating position with respect to the contact arms; and second means coupled to the carrier bars for displacing the last-named bars selectively, longitudinally and bidirectionally, from a normal position to deflect a particular one of the contact arms in a particular one of the groups against a particular one of the actuator pins in the associated group in actuating position to establish selective electrical contact between the contact arms and the contact rods.

5. A selector switch including:

a matrix made up of A actuator bars disposed for longitudinal displacement and C carrier bars disposed for longitudinal displacement in transverse and cooperative relation with respect to the actuator bars, so that N crosspoints are formed between the actuator and carrier bars, where A, C and N are integers;

a plurality of contact rods disposed in groups with the rods in each group being disposed in spaced relationship to one another and to the bars adjacent to an individual one of the N crosspoints;

a plurality of contact pins secured to the actuator bars and disposed in groups in spaced relationship to one another and to the rods in the associated groups and adjacent to the N crosspoints;

a plurality of resilient contact arms secured to the carrier bars adjacent to the N crosspoints and disposed in groups at individual ones of the N crosspoints, the contact arms in each group extending in an angular relationship to one another and having first portions extending in a direction transverse to the actuator bars and the contact bars and having a contact portion extending from the first portion in a direction substantially parallel to the carrier bars and in cooperative relationship with an individual one of the contact rods in an associated group for selective engagement with the associated rods in accordance with the selective displacement of the actuator bars and the carrier bars;

means coupled to the actuator bars for providing a selective displacement of the actuator bars; and means coupled to the carrier bars for providing a selective displacement of the carrier bars.

6. A selector switch including;

a matrix including A actuator bars mounted for longitudinal displacement from a normal position, and C carrier bars mounted for longitudinal displacement from a normal position, and in transverse and cooperative relation with respect to the A bars, so that N crosspoints, each having intra-angular spaces, are formed between the transverse A and C bars, where A, C and N are integers;

a plurality of selectable switching elements individually disposed at the different crosspoints, each of the elements including at least one resilient contact arm extending effectively across an actuator bar into an adjoining intra-angular space, and further including at least one contact rod;

means for mounting the contact rods of the switching elements in the intra-angular spaces of the N cross-points, and in cooperative relation with the contact arms;

means secured to the actuator bars in cooperative relation with the contact arms for operating selectively the switching element of a selected crosspoint in response to coexisting displacements of a selected actuator bar and a selected carrier bar forming the selected crosspoint;

means coupled to the carrier bars for displacing the selected carrier bars; and means coupled to the actuator bars for displacing the selected actuator bar.

7. A matrix-type selector switch characterized by a plurality of switching elements, operable selectively and independently, at each of the coordinate crosspoints of the matrix, and a removable connector unit having electrical connector pins utilized as integral components of the switching elements, said selector switch including;

a matrix frame;

a matrix including A actuator bars mounted on the matrix frame for longitudinal and bidirectional displacement from a normal position, and C carrier bars mounted on the matrix frame for longitudinal and bidirectional displacement from a normal position, and in transverse relation with respect to the actuator bars, so that N coordinate crosspoints are formed between the transverse actuator and carrier bars, where A, C and N represent integers;

a plurality of resilient contact arms individually secured to the carrier bars adjacent to the different coordinate crosspoints;

means secured to the actuator bars in actuating relation to the contact arms for deflecting the contact arms in response to respective displacements of selective displacements of selected actuator and carrier bars defining the individual crosspoints and in accordance with the resilient characteristics of the contact arms;

a connector unit having a base member, a plurality of electrically-conductive contact rods mounted on the base member in spaced relationship to the carrier bars and the actuator bars, and means for mounting removably the connector unit on the matrix frame in a position where the contact rods are in cooperative relation with the contact arms, thereby forming a plurality of switching elements with the contact arms in accordance with the selective deflection of the contact arms;

means coupled to the carrier bars for displacing the selected carrier bar; and means coupled to the actuator bars for displacing the selected actuator bar.

8. A matrix-type selector switch characterized by a plurality of switching elements, operable selectively and independently, at each of the coordinate crosspoints of the matrix, and removable connector units having electrical connector pins utilized as integral components of the switching elements, said selector switch comprising:

a matrix frame;

a matrix including A actuator bars mounted on the matrix frame for longitudinal and bidirectional displacement from a normal position, and C carrier bars mounted on the matrix frame for longitudinal and bidirectional displacement from a normal position in transverse relation with respect to the actuator bars, so that at least one coordinate crosspoint is formed between the transverse actuator and carrier bars, where A and C represent integers;

a plurality of resilient contact arms made from electrically conductive material and secured to the carrier bars adjacent to the coordinate crosspoint;

means secured to the actuator bars for deflecting the resilient contact arms in response to a displacement in a particular one of the two directions of a selective one of the actuator bars and to a displacement in a particular one of the two directions of a selective one of the carrier bars defining the crosspoint;

first and second connector units each having a base member and a plurality of electrically-conductive contact rods mounted on the base member;

means secured to the first connector unit for mounting the latter on one side of the matrix frame in a position where the plurality of contact rods of said first unit are in cooperative relation to the contact arms in the deflected positions of the contact arms;

means secured to the second connector unit for mounting the latter removably on the other side of the matrix frame in a position where the contact rods of the second unit are in cooperative relation with the contact arms, thereby forming a plurality of switching elements;

means coupled to the actuator bars for displacing the selected actuator bar in the particular direction; and means coupled to the carrier bars for displacing the selected carrier bar in the particular direction.

9. In a selector switch including a matrix having A displaceable actuator bars and C displaceable carrier bars in crossing relation to form at least one crosspoint defining a plurality of intra-angular spaces, where A and C represent integers, at least one switching element adjacent to the cross-point and operable in response to one combination of coexisting displacements from normal positions of the bars of the adjacent crosspoint, the said switching element including:

an elongated resilient contact arm made from an electrically conductive material and mounted on the carrier bar adjacent to the crosspoint and having a first portion disposed in a direction transverse to the actuator bars and the carrier bars to extend into a particular one of the intra-angular spaces;

a stationary contact member disposed in one of the intra-angular spaces formed by the bars of the crosspoint and in switching relation with respect to the contact arm; and means coupled to the actuator bar and in actuating relation with respect to the contact arm for engaging the first portion of the contact arm in response to the displacement of the actuator bar defining the crosspoint and for bending the first portion of the contact arm in directions toward and away from the contact member in response to displacement of the carrier bar defining the crosspoint.

10. In a matrix-type selector switch having actuator bars disposed in a first direction and carrier bars disposed in a second direction substantially perpendicular to the first direction and having first electrically conductive contacts of a plurality of switching elements fixed in position regardless of any displacements of actuator bars and the carrier bars of the matrix, a first connector unit comprising:

a plurality of contact arms mounted on the carrier bars and made from an electrically conductive material and having resilient properties and constituting second electrical contacts of the plurality of switching elements, the contact arms having first portions extending in a direction transverse to the carrier bars and actuator bars and having second portions extending in a direction substantially parallel to the carrier bars, the contact arms being disposed in a particular relationship with respect to the first electrically conductive contacts to provide a selective engagement with the contacts in accordance with the displacements of the crossing bars; and means carried by particular ones of the crossing bars for engaging the contact arms upon a displacement of the particular crossing bars to obtain a flexure of the contact arms for the selective engagement of the contact arms with the first electrically conductive contacts.

11. In a selector switch including a matrix having A displaceable actuator bars and C displaceable carrier bars having respective normal positions and mounted in crossing relation to form at least one crosspoint, where A and C represent integers, a plurality of switching elements at each crosspoint operable selectively in response to various combinations of the coexisting displacements from normal positions of the bars of each crosspoint, each of said switching elements comprising: an elongated-resilient contact arm secured to the carrier bar adjacent to the crosspoint, oriented effectively in crossing relation with respect to the actuator bar of the same crosspoint, and having a contact surface generally parallel to the longitudinal axis of the carrier bar; a stationary contact member disposed in switching relation with respect to the contact surface; and an actuating pin secured to the actuator bar in actuating relation with the contact arm for moving the latter with respect to the contact member in response to coexisting displacements in respective given directions only of the actuator bar and the carrier bar of the crosspoint from the respective normal positions of the latter bars.

12. In a selector switch including a matrix made up A displaceable actuator bars and C displaceable carrier bars having respective normal positions and mounted in crossing relation to form at least one crosspoint, where A and C represent integers, a plurality of normally-open switching elements at each crosspoint operable selectively in response to various combinations of coexisting displacements from normal positions of the bars of each crosspoint, each of said switching elements comprising: an elongated, resilient contact arm secured to the carrier bar adjacent to the crosspoint, oriented effectively in diagonally crossing relation with respect to the actuator bar of the same crosspoint, and having a contact surface generally parallel to and facing the carrier bar; a stationary contact member spaced apart from and disposed between the contact surface of the arm and the carrier bar; an actuating pin secured to the actuator bar and extending into a position adjacent the diagonal side of the contact arm generally facing away from the carrier bar, for deflecting the contact arm into wiping and contacting relation against the contact member whenever the actuator bar is displaced to move the actuating pin at least into closer proximity to the arm, and the carrier bar is displaced coexistently with the actuator bar in the direction required to bring the contact arm into deflecting relation against the contact pin.

13. An internally-programmable, matrix-type selector switch characterized by a plurality of switching elements, operable selectively and independently, at each of the coordinate crosspoints of the matrix, and a removable connector unit having electrical connector pins, or rods, utilized as integral components of the switching elements, said selector switch comprising: a matrix frame; a matrix including A actuator bars mounted on the matrix frame for longitudinal and bidirectional displacement from a normal position, and C carrier bars mounted on the matrix frame for longitudinal and bidirectional displacement from a normal position, and in transverse relation with respect to the actuator bars, so that N coordinate crosspoints are formed between the transverse actuator and carrier bars, where A, C and N represent integers; a plurality of contact arms secured to the carrier bars adjacent to each coordinate crosspoint; means secured to the actuator bars in actuating relation to the contact arms for deflecting the latter in response to displacements of the actuator and carrier bars of each crosspoint; a connector unit having a base member, a plurality of electrically-conductive contact rods mounted on the base member, and means for mounting removably the connector unit on the matrix frame; at least one means disposed in cooperative relation with respect to at least one of the contact rods for lengthening effectively the contact rod sufficiently to establish a switching relationship only between the latter and a contact arm, thereby forming at least one switching element; and means coupled to the matrix for displacing selectively the actuator bars and the carrier bars of the crosspoints.

14. An internally-programmable, matrix-type selector switch characterized by a plurality of switching elements, operable selectively and independently, at each of the coordinate crosspoints of the matrix, and a removable connector unit having electrical connector pins, or rods, utilized as integral components of the switching elements, said selector switch comprising: a matrix including A actuator bars mounted on the matrix frame for longitudinal and bidirectional displacement from the normal position, and C carrier bars mounted on the matrix frame for longitudinal and bidirectional displacement from a normal position, and in transverse relation with respect to the actuator bars, so that N coordinate crosspoints are formed between the actuator and carrier bars, where A, C and N represent integers; a plurality of contact arms secured to the carrier bars adjacent to each crosspoint; means secured to the actuator bars in actuating relation to the contact arms for deflecting the latter in response to displacements of the actuator and carrier bars of each crosspoint; a plurality of extension rods having first and second extremities; means yieldably securing the extension rods in the matrix frame at locations where the first extremities are in cooperative relation with the contact arms to form a plurality of switching elements on one side of the matrix frame, said mounting means including further means for maintaining the extension rods in normally-unyielded positions in the absence of a displacing force applied to the latter, a connector unit having a base member, a plurality of electrically-conductive contact rods mounted on the base member and having common extremities disposed in cooperative relation with the second extremities of the extension rods; means interposed between the contact rods and the second extremities of the extension rods for establishing selectively electrical contact between preselected contact rods and extension rods; means coupled to the base member for mounting the connector unit removably on the matrix frame; and means coupled to the matrix for displacing selectively the actuator bars and the carrier bars of the crosspoints.

15. In a selector switch having a matrix of displaceable bars mounted on a matrix frame, and first electrical contacts of a plurality of switching elements controlled in position by the displacements of crossing bars of the matrix, a switch connector unit comprising: a base member; a plurality of contact rods mounted on the base member; means coupled to the base member for supporting the contact rods on the matrix frame in cooperative relation with the first electrical contacts; a housing disposed around said base member and contact rods; and means coupled effectively to the base member for retracting the contact rods into the housing in order to protect the rods from damage when the connector unit is not installed on the matrix.

References Cited by the Examiner

UNITED STATES PATENTS

| | | | |
|---|---|---|---|
| 1,200,885 | 10/1916 | Schmid | 200—1 |
| 1,567,532 | 12/1925 | Marburg | 179—27.54 |
| 2,741,669 | 4/1956 | Barrett | 200—16 X |

FOREIGN PATENTS

| | | | |
|---|---|---|---|
| 201,099 | 2/1956 | Australia. | |

KATHLEEN H. CLAFFY, *Primary Examiner.*

BERNARD A. GILHEANY, *Examiner.*